United States Patent
Yoshida et al.

(10) Patent No.: US 9,899,703 B2
(45) Date of Patent: Feb. 20, 2018

(54) GEL ELECTROLYTE AND POLYMER SECONDARY BATTERY USING SAME

(71) Applicants: NEC Corporation, Tokyo (JP); NEC Energy Devices, Ltd., Kanagawa (JP)

(72) Inventors: Noboru Yoshida, Tokyo (JP); Ikiko Shimanuki, Tokyo (JP); Shinako Kaneko, Kanagawa (JP); Hitoshi Ishikawa, Tokyo (JP)

(73) Assignees: NEC Corporation, Tokyo (JP); NEC Energy Devices, LTD., Kanagawa (JP)

(*) Notice: Subject to any disclaimer, the term of this patent is extended or adjusted under 35 U.S.C. 154(b) by 0 days.

(21) Appl. No.: 14/771,684

(22) PCT Filed: Feb. 28, 2014

(86) PCT No.: PCT/JP2014/055184
§ 371 (c)(1),
(2) Date: Aug. 31, 2015

(87) PCT Pub. No.: WO2014/133171
PCT Pub. Date: Sep. 4, 2014

(65) Prior Publication Data
US 2016/0013514 A1  Jan. 14, 2016

(30) Foreign Application Priority Data
Mar. 1, 2013  (JP) ................. 2013-041322

(51) Int. Cl.
*H01M 4/13* (2010.01)
*H01M 10/0565* (2010.01)
*H01M 10/052* (2010.01)

(52) U.S. Cl.
CPC ..... *H01M 10/0565* (2013.01); *H01M 10/052* (2013.01); *H01M 2300/0085* (2013.01)

(58) Field of Classification Search
CPC ........................................... H01M 4/13
See application file for complete search history.

(56) References Cited

U.S. PATENT DOCUMENTS

2004/0043300 A1*  3/2004  Utsugi ............. H01M 10/0567
                                                  429/329
2006/0292452 A1   12/2006  Utsugi et al.
(Continued)

FOREIGN PATENT DOCUMENTS

JP  H11-354157 A  12/1999
JP  2002-100406 A  4/2002
(Continued)

OTHER PUBLICATIONS

International Search Report corresponding to PCT/JP2014/055184, dated Apr. 15, 2014 (3 pages).

*Primary Examiner* — Jacob Marks
(74) *Attorney, Agent, or Firm* — Wilmer Cutler Pickering Hale & Dorr (57) ABSTRACT

The present invention relates to a gel electrolyte comprising a cyclic sulfonic acid ester represented by formula (1). According to the present invention, it is possible to provide a gel electrolyte capable of suppressing the self-discharge of a polymer secondary battery, and a polymer secondary battery using the gel electrolyte.

(1)

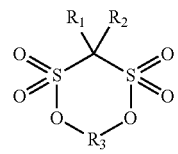

wherein $R_1$ and $R_2$ are each independently a hydrogen atom, an alkyl group having 1 to 5 carbon atoms, a halogen group or an amino group with the proviso that $R_1$ and $R_2$ are not (Continued)

hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

17 Claims, 1 Drawing Sheet

(56) References Cited

U.S. PATENT DOCUMENTS

| | | | | |
|---|---|---|---|---|
| 2009/0253049 | A1* | 10/2009 | Ishikawa | H01M 10/052 429/347 |
| 2010/0196756 | A1 | 8/2010 | Wakita et al. | |
| 2012/0308881 | A1* | 12/2012 | Tokuda | H01M 10/0567 429/199 |
| 2012/0328930 | A1* | 12/2012 | Inagaki | H01M 4/485 429/163 |
| 2013/0029218 | A1 | 1/2013 | Waki et al. | |

FOREIGN PATENT DOCUMENTS

| | | |
|---|---|---|
| JP | 2007-273445 A | 10/2007 |
| JP | 2009-070827 A | 4/2009 |
| JP | 2010-177124 A | 8/2010 |
| WO | WO-2011/004483 A1 | 1/2011 |
| WO | WO-2011/096572 A1 | 8/2011 |

* cited by examiner

GEL ELECTROLYTE AND POLYMER SECONDARY BATTERY USING SAME

CROSS-REFERENCE TO RELATED APPLICATIONS

This application is a national stage application of International Application No. PCT/JP2014/055184 entitled "Gel Electrolyte and Polymer Secondary Battery Using Same," filed on Feb. 28, 2014, which claims priority to Japanese Patent Application No. 2013-041322, filed on Mar. 1, 2013, the disclosures of each which are hereby incorporated by reference in their entirety.

TECHNICAL FIELD

The present invention relates to a gel electrolyte for a secondary battery and a polymer secondary battery using the same.

BACKGROUND ART

Lithium polymer batteries can be reduced in thickness and have a high degree of freedom in shape selection, and because of their high electrolyte solution retaining ability, the possibility of leakage of the electrolyte solution is low. For these and other such reasons, the lithium polymer batteries attract attention in a wide range of applications from electric power sources for portable devices to large scale applications such as vehicle-driving electric power sources and stationary storage batteries. Accordingly, improvements of the battery properties are demanded.

Under such circumstances, examples of the important technical problems include the improvement of safety, the improvement of high temperature storage characteristics, and the improvement of cycle characteristics. Among these, the cycle characteristics have been improved by devising the polymer materials and the like used for gel electrolyte in various manners. For example, there is proposed an improvement based on the mixing of a physical cross-linking type polymer and a chemical cross-linking type gel electrolyte (see, for example, Patent Literature 1). The cycle characteristics have also been improved by methods of suppressing the decomposition reaction of the gel electrolyte by forming a protective film on an electrode surface. For example, Patent Literature 2 and Patent Literature 3 describe the improvement of the cycle characteristics by forming a stable film on the electrode surface using a cyclic disulfonic acid ester as an additive for the gel electrolyte.

Additionally, there have been made various proposals on electrode materials, shapes, production conditions, and materials such as additives.

CITATION LIST

Patent Literature

Patent Literature 1: Japanese Patent Laid-Open No. 2002-100406
Patent Literature 2: Japanese Patent Laid-Open No. 2007-273445
Patent Literature 3: International Publication No. WO 2011/004483

SUMMARY OF INVENTION

Technical Problem

However, for the gel electrolyte comprising the disulfonic acid ester used for the secondary batteries described in the foregoing literature, there are problems such that the free acid concentration is increased when the gel electrolyte is stored; the use of this gel electrolyte reduces the viscosity of the gel electrolyte and its electrolyte solution retaining ability is decreased; and in the polymer secondary battery using this gel electrolyte, the storage characteristics of the battery are affected, and in particular, the residual capacity is decreased as the self-discharge proceeds. Because of these problems, further improvements have been demanded.

An object of the present invention is to provide a gel electrolyte and to provide a polymer secondary battery capable of suppressing the self-discharge and the decomposition of gel during the high-temperature storage of the polymer battery.

Solution to Problem

An aspect of the present invention relates to a gel electrolyte comprising a cyclic sulfonic acid ester represented by the general formula (1):

(1)

wherein $R_1$ and $R_2$ are each independently a hydrogen atom, an alkyl group having 1 to 5 carbon atoms, a halogen group or an amino group, with the proviso that $R_1$ and $R_2$ are not hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

Advantageous Effects of Invention

According to the present invention, it is possible to provide a gel electrolyte capable of suppressing the self-discharge and the gel decomposition during the high-temperature storage of a polymer battery.

DESCRIPTION OF EMBODIMENT

Figure 1:
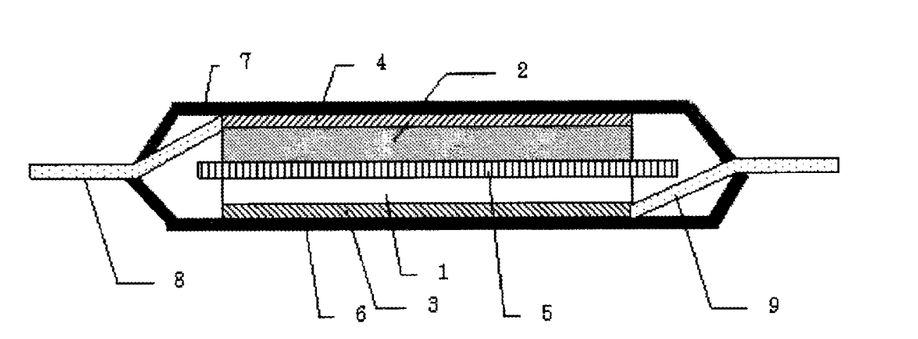
FIG. 1 is a schematic constitutional diagram of the laminate outer package type structure of the polymer secondary battery of the present invention.

The constitution of the polymer secondary battery using the nonaqueous gel electrolyte of the present invention is described with reference to the accompanying drawing. FIG. 1 is an example of the schematic constitutional diagram of the polymer secondary battery using the nonaqueous electrolyte solution or the nonaqueous gel electrolyte of the present invention. The battery according to the present invention has, for example, a structure as shown in FIG. 1. A positive electrode is formed by forming the layer 1 including a positive electrode active material as a film on the positive electrode current collector 3, and a negative elec- trode is formed by forming the layer 2 including a negative electrode active material as a film on the negative electrode current collector 4. These positive electrode and negative electrode are disposed so as to face each other through the intermediary of the porous separator 5. The porous separator 5 is disposed so as to be nearly parallel to the layer 2 including the negative electrode active material. The positive electrode tab 9 is connected to the positive electrode current collector 3, the negative electrode tab 8 is connected to the negative electrode current collector 4, and these tabs are disposed so as to extend outward from the package. In the secondary battery of the present invention, an electrode element having these positive electrode and negative electrode disposed so as to face each other and the nonaqueous gel electrolyte are housed in the outer packages 6 and 7. Examples of the shape of the secondary battery of the present embodiment include, without being particularly limited to: a laminate outer package type, a cylinder type, a square type and a coin type.

<Nonaqueous Gel Electrolyte>

The disulfonic acid ester compound included in the nonaqueous gel electrolyte is decomposed by the electrochemical redox reaction during charge-discharge reaction, and forms a film on the surface of the electrode active material, and accordingly can suppress the decomposition of the gel electrolyte and the supporting electrolyte salt. This is considered to be effective in prolonging the life time of the lithium ion secondary battery. The present inventors made a diligent study in more detail on the lithium ion secondary battery comprising a gel electrolyte including the disulfonic acid ester compound. Consequently, the storage stability was improved and the degradation was suppressed in the gel electrolyte by including the cyclic sulfonic acid ester represented by the following formula (1) in which hydrogen atom(s) at specific position(s) in the disulfonic acid ester is/are substituted with other group(s). The use of this gel electrolyte also suppressed the self-discharge of the lithium ion secondary battery. Moreover, the decrease of the gel viscosity was found to be suppressed when this gel electrolyte was stored, and the present invention was thereby achieved.

The reasons for this are not yet clear, but it is inferred that by substituting at least one of the hydrogen atoms on the carbon atom interposed between the sulfur atoms in the cyclic disulfonic acid ester with another group, the reactivity between the decomposition product of the supporting electrolyte salt and the cyclic disulfonic acid ester can be decreased, and the generation of a free acid from the gel electrolyte can be suppressed. In this way, the degradation of the active material due to the free acid during high-temperature storage can be suppressed, and in particular, the capacity decrease due to the self-discharge can be suppressed. The decomposition of the polymer due to the free acid is also suppressed and the stability of the gel is improved.

In the present embodiment, the nonaqueous gel electrolyte (hereinafter, sometimes simply referred to as the "gel electrolyte") includes, as an additive, a cyclic sulfonic acid ester represented by formula (1) (hereinafter, sometimes simply referred to as a "compound of the general formula (1)"):

wherein, in formula (1), $R_1$ and $R_2$ are each independently a hydrogen atom, an alkyl group having 1 to 5 carbon atoms, a halogen group or an amino group with the proviso that $R_1$ and $R_2$ are not hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

Examples of the alkyl groups of $R_1$ and $R_2$ include a methyl group, an ethyl group, a propyl group, a butyl group and a pentyl group; these may be either linear or branched. In particular, a methyl group, an ethyl group and a propyl group are preferable, and a methyl group and an ethyl group are more preferable. Example of the halogens of $R_1$ and $R_2$ include fluorine, chlorine, bromine and iodine, and fluorine is preferable among these.

In the cyclic sulfonic acid ester represented by the general formula (1), at least one of $R_1$ and $R_2$ is preferably substituted. Moreover, at least one of $R_1$ and $R_2$ is preferably an alkyl group, and most preferably only either one of $R_1$ and $R_2$ is an alkyl group and the other is a hydrogen atom.

The reasons for this are considered as follows. As compared with the cyclic sulfonic acid ester in which both of $R_1$ and $R_2$ are hydrogen atoms, the substitution of at least one of $R_1$ and $R_2$ suppresses the reaction with the decomposition product of the supporting electrolyte salt, and improves the film forming ability on the negative electrode surface. However, when both of $R_1$ and $R_2$ are substituted, as compared with the case where only either one of $R_1$ and $R_2$ is substituted and the other is a hydrogen atom, the reductive decomposition properties on the negative electrode surface are degraded, the film forming ability is decreased, and battery properties are degraded.

By substituting at least one of $R_1$ and $R_2$ in the cyclic sulfonic acid ester represented by the general formula (1), the stability of the gel electrolyte is improved and the electrolyte solution retaining ability is increased as compared with the case of the cyclic sulfonic acid ester in which both of $R_1$ and $R_2$ are hydrogen atoms.

In formula (1), $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group. When the linkage group represented by $R_3$ is asymmetric, the orientation thereof is not limited.

In $R_3$ of formula (1), the alkylene group and the fluoroalkylene group may be either linear or branched, and are preferably linear. In the case of a linear alkylene group, the alkylene group is represented by —$(CH_2)_n$— (n is an integer of 1 to 5), is more preferably a methylene group or an ethylene group represented by —$(CH_2)_n$— (n is 1 or 2), and is furthermore preferably a methylene group represented by —$CH_2$—. In the branched alkylene group, at least one hydrogen atom of the alkylene group represented by

—(CH$_2$)$_n$— (n is an integer of 1 to 4) is substituted with an alkyl group; examples of the branched alkylene group include —C(CH$_3$)$_2$—, —C(CH$_3$)(CH$_2$CH$_3$)—, —C(CH$_2$CH$_3$)$_2$—, —CH(C$_m$H$_{2m+1}$)— (m is an integer of 1 to 4), —CH$_2$—C(CH$_3$)$_2$—, —CH$_2$—CH(CH$_3$)—, —CH(CH$_3$)—CH(CH$_3$)—, —CH(CH$_3$)CH$_2$CH$_2$— and —CH(CH$_3$)CH$_2$CH$_2$CH$_2$—; the branched alkylene group is preferably —C(CH$_3$)$_2$— or —CH(CH$_3$)—, and is more preferably —CH(CH$_3$)—. The fluoroalkylene group means a group in which at least one of the hydrogen atoms in each of the foregoing alkylene groups is substituted with a fluorine; all the hydrogen atoms may be substituted with fluorine atoms, and the position and the number of the fluorine substitution are arbitrary. The fluoroalkylene group may either be linear or branched, and preferably linear. When all the hydrogen atoms are substituted with fluorine atoms in the linear fluoroalkylene group, R$_3$ is represented by —(CF$_2$)$_2$— (n is an integer of 1 to 5). Specifically, preferable examples of the fluoroalkylene group include monofluoromethylene group, difluoromethylene group, monofluoroethylene group, difluoroethylene group, trifluoroethylene group and tetrafluoroethylene group.

Examples of the "divalent group having 2 to 6 carbon atoms in which alkylene units or fluoroalkylene units are bonded through an ether group" in R$_3$ of formula (1) include: —R$_4$—O—R$_5$— (R$_4$ and R$_5$ each independently represent an alkylene group or a fluoroalkylene group, and the total number of carbon atoms of R$_4$ and R$_5$ is 2 to 6), and —R$_6$—O—R$_7$—O—R$_8$— (R$_6$, R$_7$ and R$_8$ each independently represent an alkylene group or a fluoroalkylene group, and the total number of carbon atoms of R$_6$, R$_7$ and R$_8$ is 3 to 6). R$_4$ and R$_5$ may both be alkylene groups or fluoroalkylene groups, or one of R$_4$ and R$_5$ may be an alkylene group and the other may be a fluoroalkylene group. R$_6$, R$_7$ and R$_8$ may each independently be an alkylene group or a fluoroalkylene group. Examples thereof include: —CH$_2$—O—CH$_2$—, —CH$_2$—O—C$_2$H$_4$—, —C$_2$H$_4$—O—C$_2$H$_4$—, —CH$_2$—O—CH$_2$—O—CH$_2$—, —CH$_2$—O—CHF—, —CH$_2$—O—CF$_2$—, —CF$_2$—O—CF$_2$—, —C$_2$F$_4$—O—C$_2$F$_4$—, —CF$_2$—O—CF$_2$—O—CF$_2$— and —CH$_2$—O—CF$_2$—O—CH$_2$—.

Among these, R$_3$ is preferably an alkylene group, a carbonyl group or a fluoroalkylene group, is more preferably an alkylene group or a fluoroalkylene group, and is furthermore preferably —(CH$_2$)$_n$— (n is 1 or 2), —C(CH$_3$)$_2$—, —CH(CH$_3$)—, a monofluoromethylene group, a difluoromethylene group, a monofluoroethylene group, a difluoroethylene group, trifluoroethylene group or a tetrafluoroethylene group.

Among these, R$_3$ is preferably —CH$_2$—, —C(CH$_3$)$_2$—, —CH(CH$_3$)—, —CHF— or —CF$_2$—, and more preferably —CH$_2$— or —CF$_2$—. The reasons for this are not clear; however, it is inferred that this is because when the compound represented by formula (1) is a compound having a six-membered ring structure, such a compound is higher in the electrochemical reactivity for forming a film as compared with a compound having a seven-membered ring structure, and accordingly a film having a lower resistance, tougher and of a higher quality is formed. R$_3$ is particularly preferably a methylene group represented by —CH$_2$—.

Among the compounds represented by formula (1), the compounds represented by the following formula (1-1) are preferable, and the compounds represented by the following formula (1-2) or the following formula (1-3) are more preferable.

(1-1)

wherein, in formula (1-1), R$_1$ and R$_2$ each independently represent a hydrogen atom, an alkyl group having 1 to 5 carbon atoms, a halogen atom or an amino group with the proviso that R$_1$ and R$_2$ are not hydrogen atoms at the same time; and R$_3$ is a methylene group which may be substituted with fluorine.

(1-2)

wherein, in formula (1-2), R represents methyl, ethyl, propyl, butyl or pentyl, and preferably represents methyl or ethyl.

(1-3)

wherein, in formula (1-3), R represents methyl, ethyl, propyl, butyl or pentyl, and preferably represents methyl or ethyl.

Table 1 specifically shows typical examples of the compounds represented by the general formula (1), but the present invention is not limited to these.

TABLE 1

| Compound No. | Compound structure |
|---|---|
| 1 | |
| 2 | |
| 3 | |

TABLE 1-continued

| Compound No. | Compound structure |
|---|---|
| 4 | (structure) |
| 5 | (structure) |
| 6 | (structure) |
| 7 | (structure) |
| 8 | (structure) |
| 9 | (structure) |

Examples of the preferable compounds of the general formula (1) include the compounds in which in formula (1), $R_1$ is a methyl group or an ethyl group, $R_2$ is a hydrogen atom, $R_3$ is a methylene group or an ethylene group. Among these, the compounds in which in formula (1), $R_1$ is a methyl group or an ethyl group, $R_2$ is a hydrogen atom and $R_3$ is a methylene group are preferable, and the compound in which in formula (1), $R_1$ is a methyl group, $R_2$ is a hydrogen atom and $R_3$ is a methylene group is more preferable.

The compounds of the general formula (1) may be used each alone or in combinations of two or more thereof.

The proportion of the compound represented by the general formula (1) in the gel electrolyte is not particularly limited, but the compound is preferably included in a concentration of 0.005 to 10% by weight of the whole gel electrolyte. By setting the concentration of the compound represented by the general formula (1) to be 0.005% by weight or more, a sufficient filming effect can be obtained. The compound represented by the general formula (1) is more preferably added in a concentration of 0.01% by weight or more, and in this way, the battery properties can be further improved. By setting the concentration to be 10% by weight or less, the the viscosity increase of the gel electrolyte and the resulting resistance increase can be suppressed. The compound is more preferably added in a concentration of 5% by weight or less, and in this way, the battery properties can further be improved.

The nonaqueous gel electrolyte of the present embodiment is not particularly limited; however, in general, the nonaqueous gel electrolyte includes a polymer and the cyclic sulfonic acid ester represented by formula (1) in addition to the nonaqueous solvent and the supporting electrolyte salt, and the nonaqueous gel electrolyte is preferably in a gelated state in the polymer secondary battery according to the present embodiment.

Examples of the polymer used in the nonaqueous gel electrolyte include, without being particularly limited to: polyacrylonitrile, polyethylene oxide and polyvinylidene fluoride. The nonaqueous solvent, the supporting electrolyte salt and the additive represented by formula (1) are added to and mixed with the polymer, and the gelated mixture can be used as the nonaqueous gel electrolyte. These gel electrolytes can be used by applying the gel electrolyte onto an electrode and appropriately evaporating the solvent by drying, and then injecting an electrolyte solution to swell the dried gel electrolyte after assembling a cell.

Alternatively, the gel electrolyte can also be produced by a method by adding the additive represented by formula (1) to polymerizable monomer having a polymerizable functional group, a nonaqueous solvent and a supporting electrolyte salt, adding an appropriate polymerization initiator if necessary, mixing, and performing polymerization and if necessary cross-linking by known methods using, if necessary, heat, light or the like to form a polymer.

In particular, as in the latter case, it is preferable to perform, in a battery outer packaging, an in-situ polymerization of the mixture prepared by mixing a polymerizable monomer, a nonaqueous electrolyte solution and desired component(s).

Examples of the polymerizable monomer usable in the formation of the polymer gel by in-situ polymerization include: monomers or oligomers having two or more polymerizable functional groups per one molecule. Specific examples of the gelation component include: ethyl(meth) acrylate; bifunctional (meth)acrylates such as ethylene glycol di(meth)acrylate, diethylene glycol di(meth)acrylate, triethylene glycol di(meth)acrylate, tetraethylene glycol di(meth)acrylate, propylene di(meth)acrylate, dipropylene di(meth)acrylate, tripropylene di(meth)acrylate, 1,3-butanediol di(meth)acrylate, 1,4-butanediol di(meth)acrylate and 1,6-hexanediol di(meth)acrylate; trifunctional (meth)acrylates such as trimethylolpropane tri(meth)acrylate, and pentaerythritol tri(meth)acrylate; tetrafunctional (meth)acrylate such as ditrimethylolpropane tetra(meth)acrylate and pentaerythritol tetra(meth)acrylate; glycidyl ether monomers such as glycidyl methacrylate; alicyclic epoxy monomers such as 3,4-epoxycyclohexylmethyl(meth)acrylate; oxetane monomers such as (3-oxetanyl)methyl(meth)acrylate, (3-methyl-3-oxetanyl)methyl(meth)acrylate, (3-ethyl-3-oxetanyl)methyl(meth)acrylate, (3-butyl-3-oxetanyl)methyl (meth)acrylate, (3-hexyl-3-oxetanyl)methyl(meth)acrylate and tetrahydrofurfuryl(meth)acrylate; and monomers having a ring-opening polymerizable functional group such as caprolactone-modified tetrahydrofurfuryl(meth)acrylate and tetrahydrofurfuryl monomer. In addition to these, monomers such as urethane(meth)acrylate can also be used.

The copolymer oligomers of these and the copolymer oligomers between these and acrylonitrile can also be used.

The (meth)acrylate means either of acrylate and methacrylate, or a substance including both of them.

The foregoing monomers, oligomers or polymers can be used each alone or in combinations of two or more kinds thereof, and can also be used as a mixture with other gelable components.

For the polymer components in the nonaqueous gel electrolyte, the total content of the polymer components consisting of a polymerizable monomer, an oligomer, a polymer and the like is preferably 0.5 to 5% by mass, and is more preferably within a range from 1 to 3% by mass of the whole nonaqueous gel electrolyte. By setting the content of the polymer components within the foregoing range, a gel electrolyte capable of well retaining the electrolyte solution can be formed, and the degradation of the battery properties due to the excessive gelation can also be suppressed.

The weight average molecular weight of the polymers in the gelated nonaqueous gel electrolyte is preferably within a range from 1000 to 5000000 and more preferably within a range from 5000 to 500000.

Examples of the lithium salt include $LiPF_6$, lithium imide salt, $LiAsF_6$, $LiAlCl_4$, $LiClO_4$, $LiBF_4$ and $LiSbF_6$. Examples of the lithium imide salt include $LiN(C_kF_{2k+1}SO_2)(C_mF_{2m+1}SO_2)$ (k and m are each independently a natural number and are each preferably 1 or 2). These may be used each alone or in combinations of two or more thereof.

The concentration of the lithium salt in the nonaqueous gel electrolyte is preferably 0.7 mol/L or more and 2.0 mol/L or less. By setting the concentration of the lithium salt to be 0.7 mol/L or more, a sufficient ionic conductivity is obtained. Also by setting the concentration of the lithium salt to be 2.0 mol/L or less, the viscosity can be decreased, and accordingly the migration of lithium ions is not hindered.

As the nonaqueous solvent, at least one solvent selected from the group consisting of cyclic carbonates, linear carbonates, aliphatic carboxylic acid esters, γ-lactones, cyclic ethers and linear ethers can be used. Examples of the cyclic carbonates include propylene carbonate (PC), ethylene carbonate (EC), butylene carbonate (BC), and the derivatives (inclusive of fluorinated compounds) of these. Examples of the linear carbonates include dimethyl carbonate (DMC), diethyl carbonate (DEC), ethyl methyl carbonate (EMC), dipropyl carbonate (DPC), and the derivatives (inclusive of fluorinated compounds) of these. Examples of the aliphatic carboxylic acid esters include methyl formate, methyl acetate, ethyl propionate, and the derivatives (inclusive of fluorinated compounds) of these. Examples of the γ-lactones include γ-butyrolactone and the derivatives (inclusive of fluorinated compounds) of this. Examples of the cyclic ethers include tetrahydrofuran, 2-methyltetrahydrofuran and the derivatives (inclusive of fluorinated compounds) of these. Examples of the linear ethers include 1,2-diethoxyethane (DEE), ethoxymethoxyethane (EME), ethyl ether, diethyl ether, and the derivatives (inclusive of fluorinated compounds) of these. As the nonaqueous solvents, in addition to these, the following can also be used: dimethyl sulfoxide, formamide, acetamide, dimethyl formamide, dioxolane (for example, 1,3-dioxolane), acetonitrile, propionitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, 1,3-propanesultone, anisole, N-methylpyrrolidone, and the derivatives (inclusive of fluorinated compounds) of these.

These nonaqueous solvents may be used each alone or in combinations of two or more thereof.

The nonaqueous gel electrolyte of the present embodiment can further include a compound having at least one sulfonyl group. Here, the compound having at least one sulfonyl group (hereinafter, also referred to as a sulfonyl group-containing compound) is a compound different from the cyclic sulfonic acid ester represented by the general formula (1). Some of the sulfonyl group-containing compounds may overlap with the foregoing nonaqueous solvents; however, the "sulfonyl group-containing compound" is usually used together with at least one nonaqueous solvent selected from the group consisting of cyclic carbonates, linear carbonates, aliphatic carboxylic acid esters, γ-lactones, cyclic ethers, linear ethers, and the fluorine derivatives of these compounds.

As the sulfonyl group-containing compound, the sultone compounds represented by the following general formula (2) are preferable:

(2)

In the general formula (2), n represents an integer of 0 to 2, $R_1$ to $R_6$ each independently represent a hydrogen atom, an alkyl group having 1 to 12 carbon atoms, a cycloalkyl group having 3 to 6 carbon atoms, or an aryl group having 6 to 12 carbon atoms.

Examples of the compounds represented by the general formula (2) include cyclic sulfonic acid esters such as 1,3-propanesultone (PS), 1,4-butanesultone and 1,3-prop-2-enesultone.

The sulfonyl group-containing compound is used in a concentration of 0.005 to 10% by weight of the whole gel electrolyte.

The gel electrolyte of the present embodiment can further include vinylene carbonate or a derivative thereof. Examples of the vinylene carbonate or the derivative thereof may include: vinylene carbonates such as vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate and 4,5-diphenylvinylene carbonate; and vinylalkylene carbonates such as vinylethylene carbonate (VEC) and divinylethylene carbonate.

Vinylene carbonate or the derivative thereof is used in a concentration of 0.005 to 10% by weight of the whole gel electrolyte.

In the present embodiment, other additives other than the foregoing compounds can also be included in the gel electrolyte, if necessary. Examples of the other additives include an overcharge-preventing agent and a surfactant.

<Negative Electrode>

The negative electrode can be prepared by forming a negative electrode active material layer including a negative electrode active material and a negative electrode binder on a negative electrode current collector. In the nonaqueous gel electrolyte secondary battery of FIG. 1, for the negative electrode active material used for the layer 2 including the negative electrode active material, one or two or more materials selected from the group consisting of lithium metal, a lithium alloy and a material capable of occluding and releasing lithium can be used, for example. As the material capable of occluding and releasing lithium ion, a carbon material or an oxide can be used.

As the carbon material, lithium-occluding materials such as graphite, amorphous carbon, diamond-like carbon and carbon nanotube, or the composite products of these can be used. Among these, the carbon material is preferably a graphite material or amorphous carbon. In particular, the graphite material is preferable because it is high in electron conductivity, is excellent in the adhesiveness with the current collector made of a metal such as copper and in the voltage flatness, contains small amount of impurities because of being formed at a high processing temperature, and thus is advantageous for the improvement of the negative electrode performances. As the oxide, any of silicon oxide, tin oxide, indium oxide, zinc oxide, lithium oxide, phosphorus oxide (phosphoric acid) and boron oxide (boric acid), or the composite products of these may be used; in particular, it is preferable to include silicon oxide. As the structure, an amorphous state is preferable. This is because silicon oxide is stable and does not cause reaction with other compounds, and the amorphous structure does not lead to the degradation due to the nonuniformities such as grain boundary and defects. As the film formation method, methods such as a vapor deposition method, a CVD method, a sputtering method and the like can be employed.

A lithium alloy is constituted with lithium and a metal capable of forming an alloy with lithium. The lithium alloy is constituted with, for example, a binary alloy or a ternary or higher-order alloy composed of a metal such as Al, Si, Pb, Sn, In, Bi, Ag, Ba, Ca, Hg, Pd, Pt, Te, Zn and La, and lithium. As the lithium metal and the lithium alloy, amorphous materials are particularly preferable. This is because amorphous structure causes less degradation resulting from the nonuniformities such as grain boundary and defects. Lithium metal or a lithium alloy can be formed by an appropriate method such as a melt cooling method, a liquid quenching method, an atomizing method, a vacuum vapor deposition method, a sputtering method, a plasma CVD method, a light CVD method, a heat CVD method, or a sol-gel method.

As the negative electrode binder, polyvinylidene fluoride, polyvinylidene fluoride-hexafluoropropylene copolymer, polyvinylidene fluoride-tetrafluoroethylene copolymer, styrene-butadiene copolymer rubber, polytetrafluoroethylene, polypropylene, polyethylene, polyimide and polyamideimide and the like can be used. The amount of the negative electrode binder to be used is preferably 0.5 to 25% by mass in relation to 100% by mass of the negative electrode active material, from the viewpoint of "sufficient binding strength" and "achievement of high energy" being in a trade-off relation with each other.

As the negative electrode current collector, aluminum, nickel, copper, silver, and alloys of these are preferable from the viewpoint of the electrochemical stability. Examples of the shape of the negative electrode current collector include foil, flat plate and mesh.

Examples of the method for forming the negative electrode active material layer include a doctor blade method, a die coater method, a CVD method and a sputtering method. The negative electrode collector may also be formed by forming a thin film of aluminum, nickel or an alloy of these on the negative electrode active material layer by a method such as vapor deposition or sputtering after the negative electrode active material layer is formed beforehand.

<Positive Electrode>

In the secondary battery of FIG. 1, examples of the positive electrode active material used for the layer 1 including the positive electrode active material include lithium-containing composite oxides such as $LiCoO_2$, $LiNiO_2$ and $LiMn_2O_4$. The positive electrode active material may also be the compounds obtained by replacing the transition metal fractions in these lithium-containing composite oxides with other metals. Lithium-containing composite oxides having a plateau at 4.2 V or more at a metal lithium counter electrode potential can also be used. Examples of the lithium-containing composite oxides include spinel type lithium manganese composite oxides, olivine-type lithium-containing composite oxides and inverse spinel-type lithium-containing composite oxides. The lithium-containing composite oxides may be a compound represented by the following formula (3):

$$Li_a(M_xMn_{2-x})O_4 \qquad (3)$$

wherein, in formula (3), 0<x<2 and 0<a<1.2; and M is at least one selected from the group consisting of Ni, Co, Fe, Cr and Cu.

As the positive electrode binder, the same binders as the negative electrode binders can be used. Among these, from the viewpoint of versatility or low cost, polyvinylidene fluoride (PVdF) is preferable. The amount of the positive electrode binder to be used is preferably 2 to 10% by mass in relation to 100 parts by mass of the positive electrode active material, from the viewpoint of the binding strength and energy density being in a trade-off relation with each other.

Examples of the binder other than polyvinylidene fluoride include polyvinylidene fluoride-hexafluoropropylene copolymer, polyvinylidene fluoride-tetrafluoroethylene copolymer, styrene-butadiene copolymer rubber, polytetrafluoroethylene, polypropylene, polyethylene, polyimide and polyamideimide.

As the positive electrode current collector, aluminum, nickel, silver, and alloys of these are preferable. Examples of the shape thereof include foil, flat plate and mesh.

The positive electrode can be obtained by dispersing and kneading these active materials together with an electrically conductive material such as carbon black and a binder such as polyvinylidene fluoride in a solvent such as N-methyl-2-pyrrolidone (NMP), and applying the resulting mixture to the positive electrode current collector such as aluminum foil.

<Method for Producing Secondary Battery>

As a method for producing a secondary battery, the method for producing the secondary battery of FIG. 1 is described as an example. In particular, there is described a case in which the gel electrolyte used is formed in the cell outer package by in-situ polymerization of a polymerizable monomer. The nonaqueous gel electrolyte secondary battery of FIG. 1 is formed as follows. In a dry air or inert gas atmosphere, a negative electrode and a positive electrode are laminated through the intermediary of the porous separator 5, and the thus obtained laminate, or the one obtained by winding the laminate is housed in a battery can or an outer package formed of, for example, a flexible film made of a laminate composed of a synthetic resin and a metal foil. Subsequently, a composition for forming polymer gel before polymerization (monomer) is injected, and subjected to in-situ cross-linking polymerization to form a gel electrolyte. The gel electrolyte solution may be formed by performing a cross-linking reaction after a composition for forming polymer gel (polymer) is beforehand housed in the battery outer package, or alternatively, a battery may be assembled after a coating layer of a polymer gel electrolyte is formed on the positive electrode, the negative electrode or the separator. An excellent film can be formed on the negative electrode by performing charging of the nonaqueous gel electrolyte secondary battery before or after the sealing of the outer package. As the porous separator 5, porous films of polyolefins such as polypropylene and polyethylene, fluororesins, and the like are used. As the outer package, any outer package can be appropriately selected as long as it is stable against the gel electrolyte and has a sufficient water vapor barrier property. For example, in the case of a layered laminate type secondary battery, a laminate film such as polypropylene and polyethylene coated with aluminum or silica can be used as the outer package. In particular, it is preferable to use an aluminum laminate film from the viewpoint of suppressing the volume expansion.

EXAMPLES

Hereinafter, the present embodiment is described more specifically by way of Examples; however, the present invention is not limited to these Examples.

Example 1

(Preparation of Battery)

The preparation of the battery of the present Example is described. As the positive electrode current collector, a 20 µm-thick aluminum foil was used, and as the positive electrode active material, $LiMn_2O_4$ was used. As the negative electrode current collector, a 10 µm-thick copper foil was used, and as the negative electrode active material, graphite was used. The negative electrode and the positive electrode were laminated on each other through the intermediary of a separator made of polyethylene, and housed in a battery outer package made of an aluminum laminate film to prepare a secondary battery.

(Preparation of Nonaqueous Gel Electrolyte)

In a nonaqueous solvent composed of 30% by mass of ethylene carbonate (EC) and 58% by mass of diethyl carbonate (DEC), 12% by mass of $LiPF_6$ as a supporting electrolyte salt was added, and then 2% by mass, in relation to 100% by mass of the electrolyte solution, of a copolymer containing ethyl acrylate and (3-ethyl-3-oxetanyl)methyl methacrylate in a ratio of 74:26 (% by mass) (number of repetitions of ethyl acrylate=2620, number of repetitions of (3-ethyl-3-oxetanyl)methyl methacrylate=420) (hereinafter, referred to as the "gel-forming substance A") was added therein, and further, a compound represented as Compound No. 2 in Table 1 was mixed in this electrolyte solution in a concentration of 0.1 mol/l, and the pregel solution for forming polymer gel electrolyte was thereby prepared. The stability evaluation test of the gel electrolyte was performed using a gel electrolyte obtained by subjecting this pregel solution to a gelation treatment of heating at 60° C. for 20 hours. A lithium polymer battery was prepared by injecting the above pregel solution from an injection port and performing vacuum impregnation, and conducting a gelation treatment at 60° C. for 20 hours, and the evaluation test of the self-discharge during high-temperature storage was performed.

The stability test of the gel electrolyte was performed as follows: the gel electrolyte was dispensed in sample tubes in a volume of 3 ml per tube, and the gel electrolyte was stored in a thermostatic bath at 60° C. for 1 week, and then the viscosity (Pa·s) of the gel electrolyte after 1 week was measured. The measurement was performed by using a tuning-fork type vibratory viscometer. The result of the viscosity of the gel electrolyte after the storage at 60° C. for 1 week is shown in Table 2.

For the evaluation of the high-temperature self-discharge of the polymer secondary battery, the polymer secondary battery was charged in a thermostatic bath at 25° C. under the charging conditions of CCCV charging, a rate of 1 C and a charging termination voltage of 4.2 V, and the battery was then discharged under the discharging conditions of CC discharging, a rate of 1 C and a discharging termination voltage of 3 V, and the capacity obtained at this point was defined as the initial discharge capacity. Next, after charging was performed under the same charging conditions as described above, the battery was stored in a thermostatic bath at 45° C. for 4 weeks, and then discharged under the same discharging conditions as described above, and the capacity was measured. The ratio of the discharge capacity after the storage at 45° C. for 4 weeks to the initial discharge capacity was calculated as the remaining capacity (%).

Examples 2 to 4

A gel electrolyte and a polymer secondary battery were prepared in the same manner as in Example 1 except that the compound shown in Table 2 was used in place of Compound No. 2 in Example 1. Then, the stability of the gel electrolyte and the high-temperature self-discharge of the polymer secondary battery were evaluated in the same manner as in Example 1. The results are shown in Table 2.

Comparative Example 1

A gel electrolyte and a polymer secondary battery were prepared in the same manner as in Example 1 except that methylenemethane disulfonic acid ester (hereinafter, referred to as "Compound A") was used in place of Compound No. 2 in Example 1. Then, the stability of the gel electrolyte and the high-temperature self-discharge of the polymer secondary battery were evaluated in the same manner as in Example 1. The results are shown in Table 2.

TABLE 2

| | Gel-forming substance | Compound represented by the general formula (1) | Remaining capacity after the storage at 45° C. for 4 weeks (%) | Viscosity of Gel Electrolyte after 1 week at 60° C. (Pa · s) |
|---|---|---|---|---|
| Example 1 | Gel-forming substance A | Compound No. 2 | 78.3 | 39 |
| Example 2 | Gel-forming substance A | Compound No. 3 | 77.1 | 36 |
| Example 3 | Gel-forming substance A | Compound No. 7 | 71.1 | 22 |
| Example 4 | Gel-forming substance A | Compound No. 8 | 69.8 | 24 |
| Example 5 | Gel-forming substance A | Compound No. 9 | 72.4 | 29 |
| Comparative Example 1 | Gel-forming substance A | Compound A | 60.2 | 15 |

As shown in Table 2, it was verified that in the polymer secondary batteries shown in Examples 1 to 5, the remaining capacity after the storage at 45° C. for 4 weeks was improved, i.e., the high-temperature self-discharge was suppressed, as compared with the polymer secondary battery of Comparative Example 1. It was also verified that in the cases where the added compound was of the compound group in which only one of $R_1$ and $R_2$ is substituted (compounds Nos. 2, 3, 7 and 9), the remaining capacity was more increased, and the self-discharge was more suppressed due to the formation of an excellent film as compared with the compound group in which $R_1$ and $R_2$ are both substituted (Compound No. 8). In addition, it was verified that in the gel electrolytes shown in Examples 1 to 5, the viscosity of the gel electrolyte after the storage at 60° C. for 1 week was increased and the polymer decomposition was suppressed, as compared with the gel electrolyte of Comparative Example 1.

Example 6

The gel electrolyte and the polymer secondary battery were prepared in the same manner as in Example 1 except that the polymer used in the preparation of the pregel solution was altered from the gel-forming substance A to a copolymer containing ethyl methacrylate and (3-ethyl-3-oxetanyl)methyl methacrylate in a ratio of 74:26 (% by mass) (number of repetitions of ethyl methacrylate=2620, number of repetitions of (3-ethyl-3-oxetanyl)methyl methacrylate=420) (hereinafter, referred to as the "gel-forming substance B"). The stability of the gel electrolyte and the high-temperature self-discharge of the polymer secondary battery were evaluated in the same manner as in Example 1. The results are shown in Table 3.

Examples 7 to 10

A gel electrolyte and a polymer secondary battery were prepared in the same manner as in Example 6 except that the compound shown in Table 3 was used in place of Compound No. 2 in Example 6. Then, the stability of the gel electrolyte and the high-temperature self-discharge of the polymer secondary battery were evaluated in the same manner as in Example 6. The results are shown in Table 3.

Comparative Example 2

A gel electrolyte and a polymer secondary battery were prepared in the same manner as in Example 6 except that Compound A was used in place of Compound No. 2 in Example 6. Then, the stability of the gel electrolyte and the high-temperature self-discharge of the polymer secondary battery were evaluated in the same manner as in Example 6. The results are shown in Table 3.

TABLE 3

| | Gel-forming substance | Compound represented by the general formula (1) | Remaining capacity after the storage at 45° C. for 4 weeks (%) | Viscosity of Gel Electrolyte after 1 week at 60° C. (Pa · s) |
| --- | --- | --- | --- | --- |
| Example 6 | Gel-forming substance B | Compound No. 2 | 76.3 | 33 |
| Example 7 | Gel-forming substance B | Compound No. 3 | 75.4 | 34 |
| Example 8 | Gel-forming substance B | Compound No. 7 | 69.1 | 18 |
| Example 9 | Gel-forming substance B | Compound No. 8 | 67.8 | 19 |
| Example 10 | Gel-forming substance B | Compound No. 9 | 70.9 | 25 |
| Comparative Example 2 | Gel-forming substance B | Compound A | 57.9 | 10 |

As shown in Table 3, it was verified that in the polymer secondary batteries shown in Examples 6 to 10, the remaining capacity after the storage at 45° C. for 4 weeks was improved, i.e., the high-temperature self-discharge was suppressed, as compared with the polymer secondary battery of Comparative Example 2. It was also verified that in the cases where the added compound was of the compound group in which only one of $R_1$ and $R_2$ is substituted (Compounds Nos. 2, 3, 7 and 9), the remaining capacity was more increased, and the self-discharge was more suppressed due to the formation of an excellent film as compared with the compound group in which $R_1$ and $R_2$ are both substituted (Compound No. 8). In addition, it was verified that in the gel electrolytes shown in Examples 6 to 10, the viscosity of the gel electrolyte after the storage at 60° C. for 1 week was increased and the polymer decomposition was suppressed as compared with the gel electrolyte of Comparative Example 2.

Example 11

A gel electrolyte and a polymer secondary battery were prepared in the same manner as in Example 1 except that the polymer added in the preparation of the pregel solution was altered from the gel-forming substance A to a mixture composed of 3.8% by mass of triethylene glycol diacrylate, 1% by mass of trimethylolpropane triacrylate and 0.5% by mass of t-butylperoxy pivalate added as a polymerization initiator (hereinafter, referred to as the "gel-forming substance C"). The stability of the gel electrolyte and the high-temperature self-discharge of the polymer secondary battery were evaluated in the same manner as in Example 1. The results are shown in Table 4.

Examples 12 to 15

A gel electrolyte and a polymer secondary battery were prepared in the same manner as in Example 11 except that the compound shown in Table 4 was used in place of Compound No. 2 in Example 11. Then, the stability of the gel electrolyte and the high-temperature self-discharge of the polymer secondary battery were evaluated in the same manner as in Example 11. The results are shown in Table 4.

Comparative Example 3

A gel electrolyte and a polymer secondary battery were prepared in the same manner as in Example 11 except that Compound A was used in place of Compound No. 2 in Example 11. Then, the stability of the gel electrolyte and the high-temperature self-discharge of the polymer secondary battery were evaluated in the same manner as in Example 11. The results are shown in Table 4.

TABLE 4

| | Gel-forming substance | Compound represented by the general formula (1) | Remaining capacity after the storage at 45° C. for 4 weeks (%) | Viscosity of Gel Electrolyte after 1 week at 60° C. (Pa · s) |
|---|---|---|---|---|
| Example 11 | Gel-forming substance C | Compound No. 2 | 75.1 | 33 |
| Example 12 | Gel-forming substance C | Compound No. 3 | 74.4 | 31 |
| Example 13 | Gel-forming substance C | Compound No. 7 | 68.1 | 15 |
| Example 14 | Gel-forming substance C | Compound No. 8 | 66.8 | 16 |
| Example 15 | Gel-forming substance C | Compound No. 9 | 70.0 | 22 |
| Comparative Example 3 | Gel-forming substance C | Compound A | 57.0 | 8 |

As shown in Table 4, it was verified that in the polymer secondary batteries shown in Examples 11 to 15, the remaining capacity after the storage at 45° C. for 4 weeks was improved, i.e., the high-temperature self-discharge was suppressed, as compared with the polymer secondary battery of Comparative Example 3. It was also verified that in the cases where the added compound was of the compound group in which only one of $R_1$ and $R_2$ is substituted (Compounds Nos. 2, 3, 7 and 9), the remaining capacity was more increased, and the self-discharge was more suppressed due to the formation of an excellent film as compared with the compound group in which $R_1$ and $R_2$ are both substituted (Compound No. 8). In addition, it was verified that in the gel electrolytes shown in Examples 11 to 15, the viscosity of the gel electrolyte after the storage at 60° C. for 1 week was increased and the polymer decomposition was suppressed as compared with the gel electrolyte of Comparative Example 3.

Example 16

(Preparation of Battery)

The preparation of the battery of the present Example is described. A 20 μm-thick aluminum foil was used as the positive electrode current collector, and $LiMn_2O_4$ was used as the positive electrode active material. A 10 μm-thick copper foil was used as the negative electrode current collector, and graphite was used as the negative electrode active material. A separator made of polyethylene was used as the separator for electronically insulating the negative electrode and the positive electrode from each other. A gel electrolyte layer was applied to and dried on both surfaces or one surface of at least one of the positive electrode, the negative electrode and the separator, which were then laminated to prepare an electrode element provided with the gel electrolyte layer. The prepared electrode element was housed in a battery outer package, then a nonaqueous solvent was injected inside the battery outer package to swell the gel electrolyte layer, and a polymer secondary battery was thereby prepared. The evaluation test of the self-discharge during high-temperature storage was performed using this lithium polymer battery in the same procedure as in Example 1.

(Preparation of Nonaqueous Gel Electrolyte Layer)

First, a solution was prepared by adding 2% by mass of polyvinylidene fluoride (hereinafter, referred to as the "gel-forming substance D") as a matrix polymer to 100% by mass of a swelling solvent (nonaqueous electrolyte solution) and uniformly mixing, and then, a compound represented as Compound No. 2 was mixed in a concentration of 0.1 mol/l in this solution to prepare an electrolyte solution. The swelling solvent used was prepared by dissolving 12% by mass of $LiPF_6$ as an electrolyte salt in a nonaqueous solvent prepared by mixing 30% by mass of ethylene carbonate and 58% by mass of diethyl carbonate. By using this electrolyte solution, the evaluation test of the stability of the gel electrolyte was performed in the same procedure as in Example 1.

Also, the above electrolyte solution was applied onto the positive electrode active material layer and the negative electrode active material layer. In this case, the application was performed so as for the thickness of the gel electrolyte layer after drying of the electrolyte solution to be 20 μm. Next, the electrolyte solution was dried under reduced pressure until the ratio between the swelling solvent and the matrix polymer reached 8:1 in terms of the weight ratio, and thus, the electrodes each provided with the gel electrolyte layer were formed. The formed electrodes were housed in a battery outer package, and then, the nonaqueous solvent was injected therein so as for the composition of the electrolyte solution to be the same as the composition before drying, and then the battery outer package was sealed.

Examples 17 to 20

A gel electrolyte and a polymer secondary battery were prepared in the same manner as in Example 16 except that the compound shown in Table 5 was used in place of Compound No. 2 in Example 16. Then, the stability of the gel electrolyte and the high-temperature self-discharge of the polymer secondary battery were evaluated in the same manner as in Example 16. The results are shown in Table 5.

Comparative Example 4

A gel electrolyte and a polymer secondary battery were prepared in the same manner as in Example 16 except that Compound A was used in place of Compound No. 2 in Example 16. Then, the stability of the gel electrolyte and the high-temperature self-discharge of the polymer secondary battery were evaluated in the same manner as in Example 16. The results are shown in Table 5.

TABLE 5

| | Gel-forming substance | Compound represented by the general formula (1) | Remaining capacity after the storage at 45° C. for 4 weeks (%) | Viscosity of Gel Electrolyte after 1 week at 60° C. (Pa · s) |
|---|---|---|---|---|
| Example 16 | Gel-forming substance D | Compound No. 2 | 70.9 | 29 |
| Example 17 | Gel-forming substance D | Compound No. 3 | 70.1 | 29 |
| Example 18 | Gel-forming substance D | Compound No. 7 | 63.3 | 15 |
| Example 19 | Gel-forming substance D | Compound No. 8 | 61.5 | 16 |
| Example 20 | Gel-forming substance D | Compound No. 9 | 64.5 | 24 |
| Comparative Example 4 | Gel-forming substance D | Compound A | 52.9 | 4 |

As shown in Table 5, it was verified that in the polymer secondary batteries shown in Examples 16 to 20, the remaining capacity after the storage at 45° C. for 4 weeks was improved, i.e., the high-temperature self-discharge was suppressed, as compared with the polymer secondary battery of Comparative Example 4. It was also verified that in the cases where the added compound was of the compound group in which only one of $R_1$ and $R_2$ is substituted (Compounds Nos. 2, 3, 7 and 9), the remaining capacity was more increased, and the self-discharge was more suppressed due to the formation of an excellent film as compared with the compound group in which $R_1$ and $R_2$ are both substituted (Compound No. 8). In addition, it was verified that in the gel electrolytes shown in Examples 16 to 20, the viscosity of the gel electrolyte after the storage at 60° C. for 1 week was increased and the polymer decomposition was suppressed as compared with the gel electrolyte of Comparative Example 4.

Example 21

A gel electrolyte and a polymer secondary battery were prepared in the same manner as in Example 16 except that the matrix polymer was polyacrylonitrile (hereinafter, referred to as the "gel-forming substance E") in place of the gel-forming substance D in Example 16. The stability of the gel electrolyte and the high-temperature self-discharge of the polymer secondary battery were evaluated in the same manner as in Example 1. The results are shown in Table 6.

Examples 22 to 25

A gel electrolyte and a polymer secondary battery were prepared in the same manner as in Example 21 except that the compound shown in Table 6 was used in place of Compound No. 2 in Example 21. Then, the stability of the gel electrolyte and the high-temperature self-discharge of the polymer secondary battery were evaluated in the same manner as in Example 21. The results are shown in Table 6.

Comparative Example 5

A gel electrolyte and a polymer secondary battery were prepared in the same manner as in Example 21 except that Compound A was used in place of Compound No. 2 in Example 21. Then, the stability of the gel electrolyte and the high-temperature self-discharge of the polymer secondary battery were evaluated in the same manner as in Example 21. The results are shown in Table 6.

TABLE 6

| | Gel-forming substance | Compound represented by the general formula (1) | Remaining capacity after the storage at 45° C. for 4 weeks (%) | Viscosity of Gel Electrolyte after 1 week at 60° C. (Pa · s) |
|---|---|---|---|---|
| Example 21 | Gel-forming substance E | Compound No. 2 | 70.0 | 27 |
| Example 22 | Gel-forming substance E | Compound No. 3 | 68.9 | 28 |
| Example 23 | Gel-forming substance E | Compound No. 7 | 62.7 | 15 |
| Example 24 | Gel-forming substance E | Compound No. 8 | 60.1 | 15 |
| Example 25 | Gel-forming substance E | Compound No. 9 | 64.5 | 24 |
| Comparative Example 5 | Gel-forming substance E | Compound A | 52.1 | 6 |

As shown in Table 6, it was verified that in the polymer secondary batteries shown in Examples 21 to 25, the remaining capacity after the storage at 45° C. for 4 weeks was improved, i.e., the high-temperature self-discharge was suppressed, as compared with the polymer secondary battery of Comparative Example 5. It was also verified that in the cases where the added compounds was of the compound group in which only one of $R_1$ and $R_2$ is substituted (Compounds Nos. 2, 3, 7 and 9), the remaining capacity was more increased, and the self-discharge was more suppressed due to the formation of an excellent film as compared with the compound group in which $R_1$ and $R_2$ are both substituted (Compound No. 8). In addition, it was verified that in the gel electrolytes shown in Examples 21 to 25, the viscosity of the gel electrolyte after the storage at 60° C. for 1 week was increased and the polymer decomposition was suppressed as compared with the gel electrolyte of Comparative Example 5.

Example 26

A gel electrolyte and a polymer secondary battery were prepared in the same manner as in Example 16 except that the matrix polymer was polyethylene oxide (hereinafter, referred to as the "gel-forming substance F") in place of the gel-forming substance D in Example 16. The stability of the gel electrolyte and the high-temperature self-discharge of the polymer secondary battery were evaluated in the same manner as in Example 1. The results are shown in Table 7.

Example 27 to 30

A gel electrolyte and a polymer secondary battery were prepared in the same manner as in Example 26 except that the compound shown in Table 6 was used in place of Compound No. 2 in Example 26. Then, the stability of the gel electrolyte and the high-temperature self-discharge of the polymer secondary battery were evaluated in the same manner as in Example 26. The results are shown in Table 7.

Comparative Example 6

A gel electrolyte and a polymer secondary battery were prepared in the same manner as in Example 26 except that Compound A was used in place of Compound No. 2 in Example 26. Then, the stability of the gel electrolyte and the high-temperature self-discharge of the polymer secondary battery were evaluated in the same manner as in Example 26. The results are shown in Table 7.

TABLE 7

| | Gel-forming substance | Compound represented by the general formula (1) | Remaining capacity after the storage at 45° C. for 4 weeks (%) | Viscosity of Gel Electrolyte after 1 week at 60° C. (Pa · s) |
|---|---|---|---|---|
| Example 26 | Gel-forming substance F | Compound No. 2 | 71.1 | 29 |
| Example 27 | Gel-forming substance F | Compound No. 3 | 69.8 | 30 |
| Example 28 | Gel-forming substance F | Compound No. 7 | 63.0 | 14 |
| Example 29 | Gel-forming substance F | Compound No. 8 | 59.8 | 15 |
| Example 30 | Gel-forming substance F | Compound No. 9 | 66.4 | 23 |
| Comparative Example 6 | Gel-forming substance F | Compound A | 51.6 | 7 |

As shown in Table 7, it was verified that in the polymer secondary batteries shown in Examples 26 to 30, the remaining capacity after the storage at 45° C. for 4 weeks was improved, i.e., the high-temperature self-discharge was suppressed, as compared with the polymer secondary battery of Comparative Example 6. It was also verified that in the cases where the added compound was of the compound group in which only one of $R_1$ and $R_2$ is substituted (Compounds Nos. 2, 3, 7 and 9), the remaining capacity was more increased, and the self-discharge was more suppressed due to the formation of an excellent film as compared with the compound group in which $R_1$ and $R_2$ are both substituted (Compound No. 8). In addition, it was verified that in the gel electrolytes shown in Examples 26 to 30, the viscosity of the gel electrolyte after the storage at 60° C. for 1 week was increased and the polymer decomposition was suppressed as compared with the gel electrolyte of Comparative Example 6.

INDUSTRIAL APPLICABILITY

Examples of the application of the present invention include driving devices such as electric vehicles, hybrid electric vehicles, electric motorcycles and electric power-assisted bicycles; tools such as electric tools; electronic devices such as portable terminals and notebook personal computers; and storage batteries for household electricity storage systems and solar power generation systems.

EXPLANATION OF SYMBOLS

1: positive electrode active material layer
2: negative electrode active material layer
3: positive electrode current collector
4: negative electrode current collector
5: porous separator
6: laminate outer package
7: laminate outer package
8: negative electrode tab
9: positive electrode tab

The invention claimed is:
1. A gel electrolyte comprising a cyclic sulfonic acid ester represented by the general formula (1):

(1)

wherein in the general formula (1), $R_1$ is a hydrogen atom, $R_2$ is —$C_mH_{2m+1}$ (m=1, 2 or 3) and $R_3$ is —$CH_2$.

2. The gel electrolyte according to claim 1, further comprising a compound having one or more sulfonyl groups in addition to the cyclic sulfonic acid ester represented by the general formula (1).

3. The gel electrolyte according to claim 2, comprising, as the compound having a sulfonyl group, a sultone compound represented by the following general formula (2):

(2)

wherein in the general formula (2), n is an integer of 0 or more and 2 or less; and $R_1$ to $R_6$ are each independently selected from the group consisting of a hydrogen atom, an alkyl group having 1 or more and 12 or less carbon atoms, a cycloalkyl group having 3 or more and 6 or less carbon atoms and an aryl group having 6 or more and 12 or less carbon atoms.

4. The gel electrolyte according to claim 1, wherein the cyclic sulfonic acid ester represented by the general formula (1) is included in a content of 0.005% by mass or more and 10% by mass or less in relation to the total mass of the gel electrolyte.

5. The gel electrolyte according to claim 1, further comprising a vinylene carbonate or a derivative thereof.

6. The gel electrolyte according to claim 1, comprising one or two or more polymers selected from the group consisting of poly(meth)acrylate, polyvinylidene fluoride, polyacrylonitrile and polyethylene oxide.

7. The gel electrolyte according to claim 1, comprising, as a nonaqueous solvent, one or more solvents selected from the group consisting of cyclic carbonates, linear carbonates, aliphatic carboxylic acid esters, γ-lactones, cyclic ethers, linear ethers and the fluorine derivatives of these compounds.

8. The gel electrolyte according to claim 1, comprising, as a lithium salt, one or more materials selected from the group consisting of $LiPF_6$, $LiBF_4$, $LiAsF_6$, $LiSbF_6$, $LiClO_4$, $LiAlCl_4$, and $LiN(C_nF_{2n+1}SO_2)(C_mF_{2m+1}SO_2)$ (n and m are each independently a natural number).

9. A polymer secondary battery comprising the gel electrolyte according to claim 1 in a secondary battery comprising at least a positive electrode and a negative electrode.

10. The polymer secondary battery according to claim 9, comprising, as a positive electrode active material, a lithium-containing composite oxide.

11. The polymer secondary battery according to claim 9, comprising, as a negative electrode active material, one or more materials selected from the group consisting of a material capable of occluding and releasing lithium, lithium metal, a metal material capable of forming an alloy with lithium and an oxide material.

12. The polymer secondary battery according to claim 11, comprising, as the negative electrode active material, a carbon material.

13. The polymer secondary battery according to claim 12, wherein the carbon material is graphite.

14. The polymer secondary battery according to claim 12, wherein the carbon material is amorphous carbon.

15. The polymer secondary battery according to claim 9, comprising a film outer package.

16. A battery for a vehicle comprising the secondary battery according to claim 9.

17. A vehicle using the battery for a vehicle according to claim 16.

* * * * *